United States Patent [19]
Lee

[11] Patent Number: 6,070,566
[45] Date of Patent: Jun. 6, 2000

[54] PISTON FOR DIRECT INJECTION COMBUSTION CHAMBER USED IN INTERNAL COMBUSTION ENGINE

[75] Inventor: Jeong-heon Lee, Kyungki-do, Rep. of Korea

[73] Assignee: Hyundai Motor Company, Seoul, Rep. of Korea

[21] Appl. No.: 09/315,883

[22] Filed: May 20, 1999

[30] Foreign Application Priority Data

May 22, 1998 [KR] Rep. of Korea ...................... 98-18592

[51] Int. Cl.[7] ...................................... F02B 23/06
[52] U.S. Cl. ........................... 123/298; 123/301; 123/305
[58] Field of Search .................................. 123/276, 298, 123/301, 305, 295

[56] References Cited

U.S. PATENT DOCUMENTS 5,115,774  5/1992  Nomura et al. .......................... 123/302
5,140,958  8/1992  Kobayashi et al. ...................... 123/276
5,553,588  9/1996  Gono et al. .............................. 123/276
5,806,482  9/1998  Igarashi et al. .......................... 123/295
5,873,344  2/1999  Kudou et al. ............................ 123/295

*Primary Examiner*—Erick R. Solis
*Attorney, Agent, or Firm*—Christie, Parker & Hale, LLP

[57] ABSTRACT

A direct fuel injection type internal combustion engine includes a combustion chamber formed by a cylinder head having a spark plug, a fuel injector and an air intake means with a swirl control valve, a cylinder wall, and a piston head having a vaporization portion. The upper surface of the piston head has a vaporization portion defined with a bottom surface formed with a predetermined depth and slant, an arc-shaped first wall connected to the bottom surface and formed to exhaust side, an arc-shaped second wall connected to the bottom surface and formed parallel to the first wall, a protrusion portion formed between the first wall and the second wall, and an arc-shaped third wall connected to the bottom surface and formed to an intake side.

13 Claims, 6 Drawing Sheets

Intake ←          → Exhaust

Intake ← → Exhaust

Intake ← → Exhaust

Intake ← → Exhaust

Intake ← → Exhaust

Intake ← → Exhaust

Intake ← → Exhaust

Intake ← → Exhaust

PISTON FOR DIRECT INJECTION COMBUSTION CHAMBER USED IN INTERNAL COMBUSTION ENGINE

BACKGROUND OF THE INVENTION (a) Field of the Invention

The present invention relates to a piston for direct injection internal combustion engines enables the engine to realize an lean burn.

(b) Description of the Related Art

Generally, internal combustion engines are operated by supplying an air/fuel mixture into a cylinder, and compressing and igniting the mixture. A procedure for generating power in internal combustion engines to drive a vehicle comprises the steps of supplying an air through air supply system, injecting fuel such that it can mix with the air during an intake stroke, spraying the air-fuel mixture into a vaporization portion, igniting the mixture using a spark plug, and exhausting burned gas through an exhaust system.

Recently, much research and development is being pursued for improving fuel consumption ratio and reducing emission utilizing the direct injection internal combustion engines.

As one type of such an engine having a direct fuel injection system, an engine having two intake ports, one of which includes a swirl control valve for regulating swirl in a combustion chamber, has been introduced for enhancing the efficiency of flame propagation.

An example of this type of engine is disclosed in U.S. Pat. No. 5,553,588. FIGS. 1 and 2 are respective front cross-sectional and top views of U.S. Pat. No. 5,553,588.

In FIG. 1, reference numeral 10 denotes a combustion chamber, 30 a piston, and 50 a vaporization portion formed in an upper surface of the piston 30. Reference numeral 20 in drawing denotes a fuel injection valve that directly injects fuel into the combustion chamber 10, and 40 is a spark plug. In addition, 70a and 70b, and 90a and 90b (only 70a and 90a are shown in FIG. 1.) indicate intake valves and exhaust valves, respectively. In such a conventional engine, since each cylinder has two intake valves and two exhaust valves, this configuration is known as a four-valve chamber.

As shown in FIG. 2, intake passages 110a and 110b are provided for supplying air into the combustion chamber 10. The intake passages 110a and 110b are connected respectively to intake ports 80a and 80b. The intake port 80a has a helical configuration that guide the flow of intake air in a spiral direction, thus serving as what is known as a swirl port. In contrast to the intake port 80a, the intake port 80b is a straight port through which intake air flows linearly into the combustion chamber 10. The intake passage 110b that is connected to the intake port 80b, i.e., the straight port, is provided with a swirl control valve 200.

With reference to FIG. 3, the vaporization portion 50 formed in the upper surface of the piston 30 has a first wall 50a, a second wall 50b and a third wall 50c. The first and third walls 50a and 50c are arcuate and disposed so as to be mutually opposing along the direction of the swirl flow. The first and third walls 50a and 50c are connected, on a side opposing the fuel injection valve 20, by the second region 50b.

In FIG. 4, showing another example of the piston 30 disclosed in the U.S. Pat. No. 5,553,588, a pocket 50d is formed in a portion of the vaporization portion 50 corresponding to approximately where the second wall 50b and the third wall 50c meet. The pocket 50d enlarges a capacity of the third wall 50c.

In FIG. 5 showing yet another example of the piston 30, a part 50e of the second wall 50b, which is positioned on downstream side of the swirl flow with respect to the spark plug 40, is formed inwardly toward the spark plug 40 so that a constant distance is maintained between the spark plug 40 and this area of the vaporization portion 50.

FIGS. 3, 4, and 5 illustrate primary stages at which fuel is injected into the vaporization portion 50.

The process of combustion of the air-fuel mixture according to the above described engine having a direct injection combustion chamber will be described hereinafter with reference to the drawings.

On the intake stroke the piston 30 moves toward the bottom dead center in the combustion chamber 10 by a crankshaft and connecting rod (not shown). During the intake stroke, the intake valve 70a is held open by the camshaft (not shown). Since the piston 30 moves down in the combustion chamber 10, a low-pressure area is created such that the air is forced past the intake valve 70a into the combustion chamber 10.

As the piston 30 moves toward the top dead center by the crankshaft from a bottom dead center, the intake valve 70a closes. The air is trapped in the combustion chamber 10 and therefore compressed by the piston moving upward. When the piston has reached near top dead center, a predetermined amount of fuel is injected into the combustion chamber 10 from the injector 20. The fuel is diffused and vaporized in the depressed vaporization portion 50 that the air-fuel mixture is concentrated around the spark plug 40 by the walls of the vaporization portion 50.

Now, the behavior of the fuel injected into the combustion chamber 10 of the direct fuel injection engine of the prior art will be explained in more detail.

The fuel injected into the vaporization portion 50 strikes on a bottom surface of the vaporization portion 50 to form a cloud of fuel mist. This fuel mist is carried by the swirl and flows along the arc-shaped first wall 50a. During the time the fuel mist flows along the first wall 50a, the fuel particles are diffused and vaporized to form the ignitable air-fuel mixture, which reaches the second wall 50b. Because the second wall 50b is an approximate straight line, the ignitable air-fuel mixture passes quickly along the second wall 50b to pass by the spark plug 40, after which the air-fuel mixture flows into the third wall 50c. However, since the capacity of the third wall 50c side of the vaporization portion 50 is larger than the capacity of the first wall 50a side of the vaporization portion 50, even when there is a large amount of fuel injected, the injected fuel is prevented from accumulating in the area near the spark plug 40. Therefore, an air-fuel mixture of a sufficient concentration is not formed in the area near the spark plug 40.

In the above state, the air-fuel mixture is ignited by a spark from the spark plug 40 and expansion of the burning mixture causes a rapid rise in pressure. This increased pressure forces the piston down on the power stroke, causing the crankshaft to rotate. At the end of the power stroke the camshaft (not shown) opens the exhaust valve 90*a*, and the exhaust stroke begins. Remaining pressure in the combustion chamber 10 and upward movement of the piston 30 force the end gases out of the combustion chamber 10. However, in the prior engine having the direct fuel injection system, since the injector 20 is oriented to the direction of the bore center of the piston 30 to spray the fuel to the first wall 50*a* of the vaporization portion 50, the fuel injected at the end of the compression stroke can overflow out of the vaporization portion 50 at the moment the fuel contacts to the surface of the vaporization portion 50 by spraying pressure. This in turn, causes irregular ignition such that it is impossible to obtain uniform expansion power.

Furthermore, because an adhesive effect, in which some of the fuel adheres to the wall of the vaporization portion 50, occurs while the fuel passes over the second wall 50*b*, problems result such as deterioration in stratification of the fuel and the realization of only partial vaporization. Accordingly, the piston is heated excessively, resulting in a lower air-fuel ratio than is ideal.

SUMMARY OF THE INVENTION

The present invention has been made in an effort to solve the above problems of the prior art.

It is an object of the present invention to provide a piston for a direct injection combustion chamber in which the piston has a depressed vaporization portion for preventing injected fuel from overflowing out of the vaporization portion, and enabling an air-fuel mixture to be accumulated near a spark plug such that combustion with a lean air-fuel mixture is possible.

To achieve the above object, a piston according to the present invention is provided with a vaporization portion formed in an upper surface of the piston. The vaporization portion includes a bottom surface inclined at a predetermined angle, an arc-shaped first wall formed to an exhaust side, a arc-shaped second wall parallel with the first wall, a protrusion area formed between the first and second walls and near a bore center of the piston, and an arc-shaped third wall formed to an intake side opposite to the first and second walls.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A piston of a direct injection combustion chamber used in internal combustion engines according to a preferred embodiment of the present invention will be hereinafter described with reference to the accompanying drawings.

Figure 1:
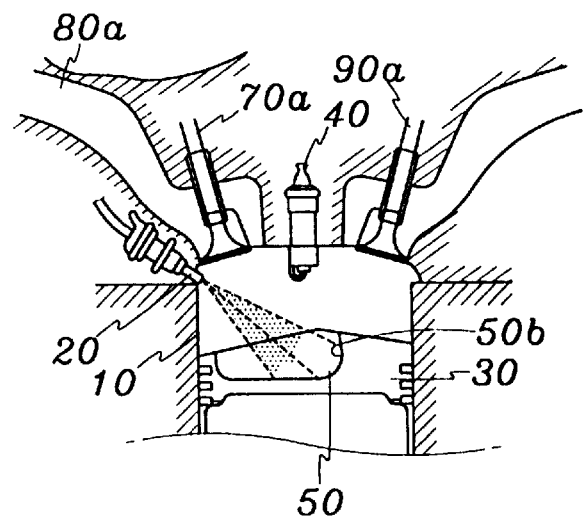
FIG. 1 is a front cross sectional view of a conventional gasoline engine having a direct fuel injection system.
Figure 2:
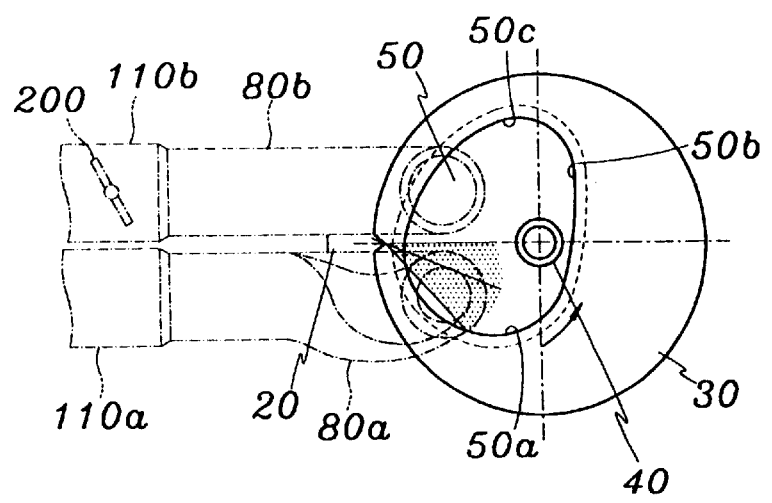
FIG. 2 is a top view of a piston and related elements shown in FIG. 1.
Figure 3:
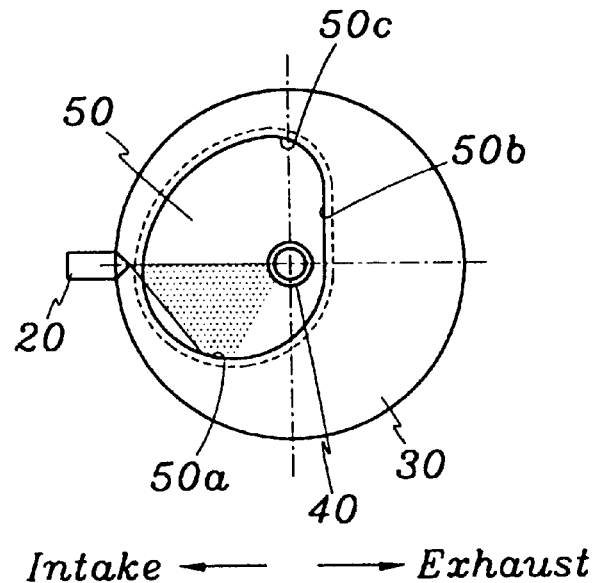
FIG. 3 is a top view of the piston shown in FIG. 1 according to a first embodiment in a state where fuel is injected into a vaporization portion.
Figure 4:
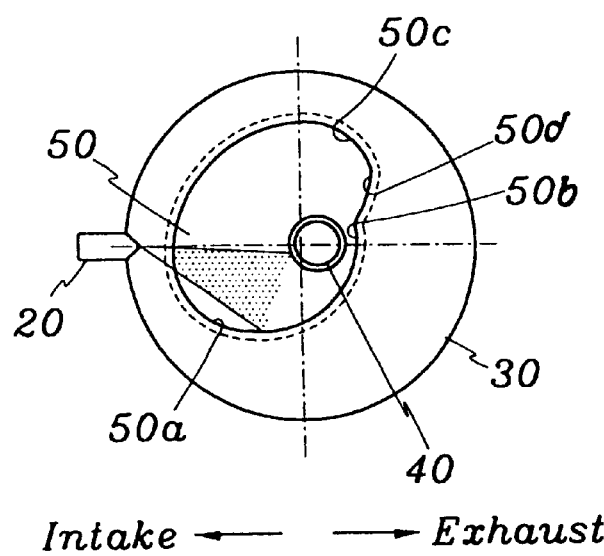
FIG. 4 is a drawing illustrating the step in which of fuel is injected into a vaporization portion according to a second embodiment of the prior art.
Figure 5:
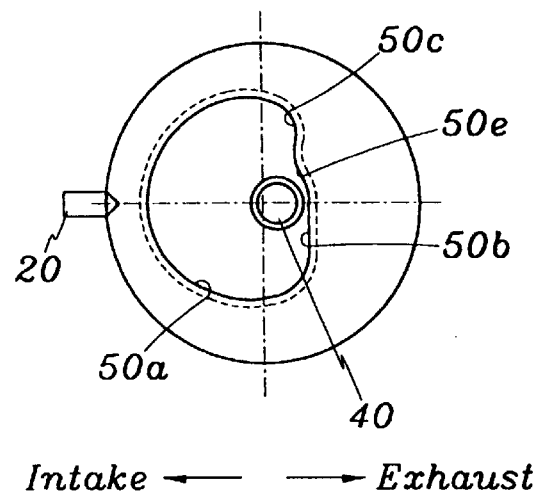
FIG. 5 is a drawing illustrating the step in which of fuel is injected into a vaporization portion according to a third embodiment of the prior art.
Figure 6:
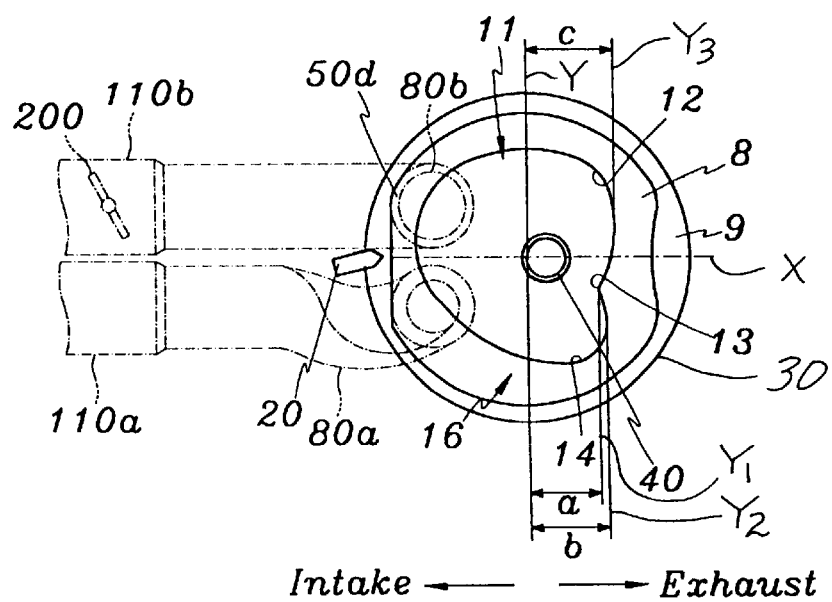
FIG. 6 is a top view of a piston and related elements according to a preferred embodiment of the present invention.

Referring first to FIG. 6, in a cylinder head (not shown) of an engine, first and second intake passages 110*a* and 110*b* are provided for supplying air into a combustion chamber 10. The first and second intake passages 110*a* and 110*b* are connected respectively to first and second intake ports 80*a* and 80*b*. The first intake port 80*a* has a helical configuration that guides the flow of intake air in a rotational direction, thus serving as what is known as a swirl port. In contrast, the second intake port 80*b* is a straight port such that air flows linearly therethrough into the combustion chamber 10. The second intake passage 110*b*, which is connected to the second intake port 80*b*, is provided with a swirl control valve 200. A firing tip of a spark plug 40 enters the combustion chamber 10, substantially pointing a center of a piston 30.

Figure 7:
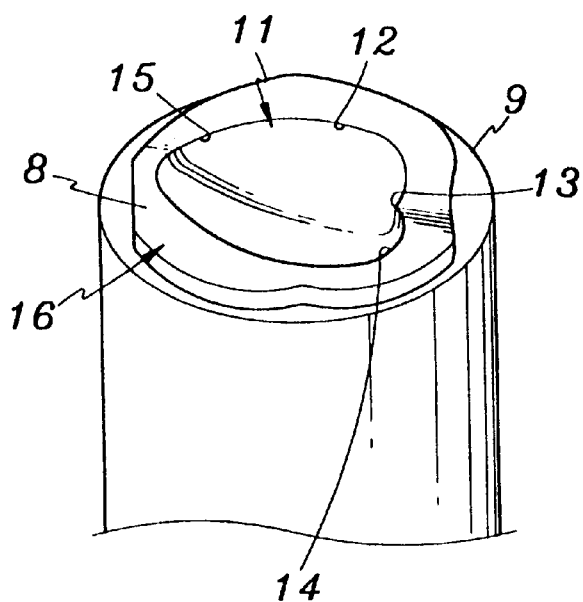
FIG. 7 is a schematic view of the piston shown in FIG. 6.

With reference to FIG. 7, a platform 8 is formed on a piston head 9 of the piston 30. Further, a depressed vaporization portion 16 is formed in the platform 8 for improving a fuel combustion ratio. The depressed vaporization portion 16 comprises a declining bottom surface 11, a first wall 12, a second wall 14, and a third wall 15, and a protrusion portion 13 formed between the first and the second walls 12 and 14. The bottom surface 11, the walls 12, 14 and 15, and the protrusion portion 13 are all integrally formed such that vaporization portion 16 has a large cross-sectional area. As can be seen in FIGS. 6 and 9, the arc-shaped second wall 14 has a smaller radius of curvature than the arc-shaped first wall 12.

As shown in drawings, the first wall 12 and the second wall 14 are disposed so as to be mutually opposing along the direction of the swirl flow, both the walls 12 and 14 being arcuate. The first and second walls 12 and 14 are connected on a side opposing the fuel injection valve 20 such that the protrusion portion 13 is formed at an area where both the walls 12 and 14 are connected. Also, the first wall 12 and the second wall 14 are connected on an opposite side by the third wall 15, which is arcuate and has relatively large radius.

Figure 8:
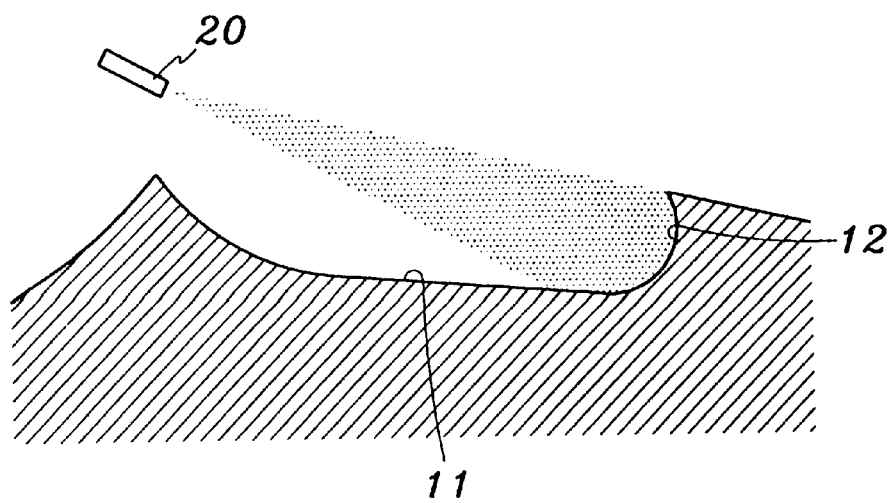
FIG. 8 is a partial front cross sectional view of the piston shown in FIG. 6.

As shown in FIG. 8, the bottom surface 11 of the vaporization portion 16 is in a direction away from the fuel injection valve 20 such that the fuel injected into the vaporization portion 16 can accumulate near the spark plug 40. The third wall 15 is formed below where the fuel injector 20 enters the combustion chamber 10 and acts to collect drops of the fuel after injection of the same is finished. This configuration of the vaporization portion 16 prevents excessively injected fuel from being poorly combusted.

As shown in FIG. 6, if first and second imaginary perpendicular lines x and y are drawn over the top of the piston 30, dividing the same into four equal sections, the first perpendicular line x being positioned between the first and second intake ports 80a and 80b, imaginary distance lines can be drawn parallel to the second perpendicular line y. That is, a first distance line $y_1$ is formed parallel to the second perpendicular line y marking an inward extreme (with regard to the vaporization portion 16) of the protrusion portion 13, a second distance line $y_2$ is formed parallel to the second perpendicular line marking an outward extreme (with regard to the vaporization portion 16) of the second wall 14, and a third distance line $y_3$ is formed parallel to the second perpendicular line $y_2$ marking an outward extreme (with regard to the vaporization portion 16) of the first wall 12.

With the formation of the imaginary distance lines $y_1$, $y_2$, and $y_3$ as in the above, there are provided a first distance (a) between the second perpendicular line y and the first distance line $y_1$, a second distance (b) between the second perpendicular line y and the second distance line $y_2$, and a third distance (c) between the second perpendicular line y and the third distance line $y_3$. In the present invention, it is preferable that a<b<c. Here, it is preferable that the first distance (a) is 10 to 17 mm.

The fuel injector 20 is oriented at an angle between 10 and 20° with respect to the bore center of the piston such that the fuel is injected into a pocket defined by the arc-shaped first wall 12. This results in the formation of a fuel mist. The fuel mist is carried by the swirl and flows along the arc-shaped first wall 12. During the time the fuel mist flows along the first wall 12, the fuel particles are diffused and vaporized to form the ignitable air-fuel mixture. Subsequently, the ignitable air-fuel mixture moves away from the first wall 12, because of the protrusion portion 13 formed between the first and the second walls 12 and 14 such that the speed at which the air-fuel mixture flows is reduced. Accordingly, the air-fuel mixture comes to be concentrated near the spark plug 40. At this time, fuel that passes through the protrusion portion 13 without undergoing vaporization flows to collide into the second wall 14 to be vaporized.

Through experimentation, it was founded that without the formation of the protrusion portion 13, ignition was performed in a range of 57~59° before the end of the compression stroke in crank angle, while in the case where the protrusion portion 13 is formed, ignition was performed in a range of 64~67° before the end of the compression stroke in crank angle so as to provide time for the vaporized fuel to expand approximately 7~8°.

Table 1 shows the results of an efficiency test of two pistons, each having vaporization portions but with different shapes. That is, for a first subject, a Toyota piston provided in a direct fuel injection engine was tested and for a second subject, the inventive piston 30 having the vaporization portion 16 with the protrusion portion 13 was tested.

Test conditions were as follows: a fuel injector was disposed oriented to an angle of 10° with respect to the bore center of the piston, revolutions per minute of the engine was maintained at 1800 rpm, and combustion pressure was 2 bar. Tested items were an air/fuel ratio, an amount of total hydrocarbons, and a lean misfire limit.

<Table 1>

| Test Subjects | Rpm/bar | air/fuel ratio to $\lambda = 1$ (%) | THC (ppm) | INJ.TIM (BTDC) | S/A (BTDC) | Opt. A/F | LML | SCV angle (°) |
|---|---|---|---|---|---|---|---|---|
| Toyota Piston | 1800/2.0 | 14.2 | 4500 | 67 | 23 | 34.0 | 40 | 30 |
| Inventive Piston | 1800/2.0 | 15.8 | 3850 | 67 | 23 | 30.0 | 41 | 30 |

THC: Total Hydrocarbon, S/A: Spark timing Advance, A/F: Air/Fuel ratio, LML: Lean Misfire Limit As shown in table 1, the piston of the present invention resulted in superior performance compared to the conventional piston with regard to air/fuel ratio and total hydrocarbon amount. An improvement of about 1.6% was realized in the air/fuel ratio of the engine using the piston according to the present invention compared to when utilizing the conventional piston, and the total hydrocarbon amount in the exhaust gas of the engine using the piston according to the present invention was found to be less than that of the engine using the Toyota piston by about 650 ppm. Also, the lean misfire limit of the engine using the piston of the present invention was higher than that using the conventional piston.

The process of combustion of the air-fuel mixture in the engine provided with the piston according to the preferred embodiment of the present invention will be described hereinafter with reference to FIGS. 9a, 9b, and 9c.

Figure 9A:
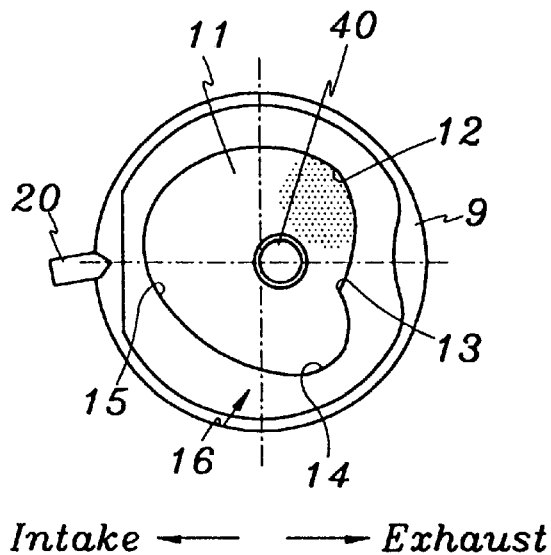
FIGS. 9*a*, 9*b*, and 9*c* are drawings illustrating the movement of fuel injected onto the piston shown in FIG. 6.
Figure 9B:
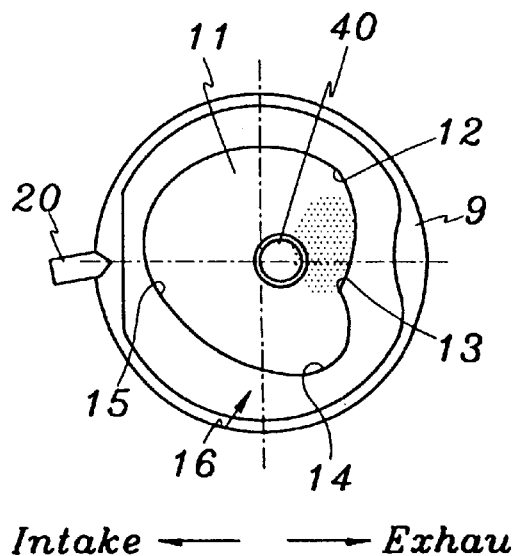
Figure 9C:
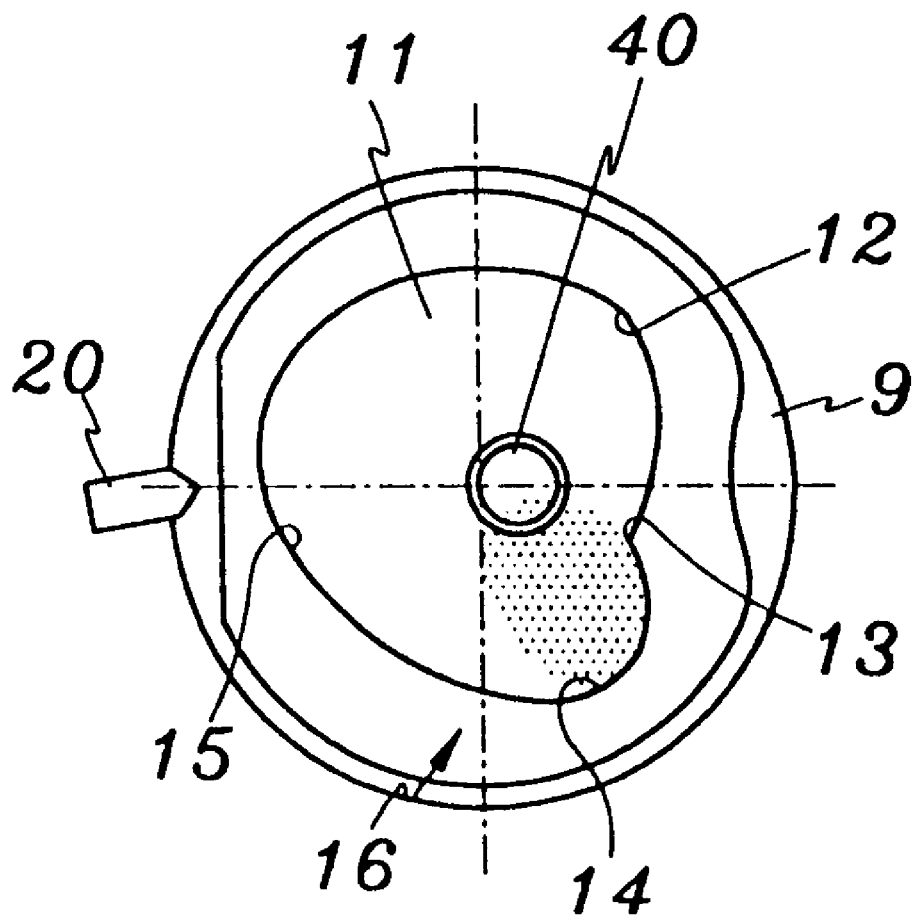

As shown in FIG. 9a, the fuel is injected into the first wall 12 of the vaporization portion 16 at a relatively late stage in the compression stroke. This fuel forms a cloud of fuel mist and this fuel mist is carried by the swirl and flows along the arc-shaped first wall 12. During the time the fuel mist is flowing along the first wall 12, the fuel particles are diffused and vaporized to form the ignitable air-fuel mixture, and when the air-fuel mixture reaches the protrusion portion 13, it moves away from the first wall 12 and concentrates near the spark plug 40 (see FIG. 9b). The air-fuel mixture distanced from the first wall 12 remains near the spark plug 40 for a relatively long period (see FIG. 9c). While the air-fuel mixture remains near the spark plug 40, the spark plug 40 ignites the air-fuel mixture.

In the above, because fuel injection is performed at 64~67° before the top dead center of the compression stroke in crank angle, the fuel can be sufficiently vaporized.

To analyze the efficiency of the engine utilizing a direct fuel injection system in which the piston 30 of the present invention is mounted, engine efficiency tests were performed and several measurements were made. Table 2 shows the results of the efficiency tests.

In this test, various measurements as shown in table 1 were made at different revolutions per minute of 1300, 1500, 1800, and 2400 rpm.

TABLE 2

| rpm/bar | BSFC (g/kwh) | Improved air/fuel ratio to λ = 1 (%) | THC (ppm) | INJ.TIM (BTDC) | S/A (BTDC) | A/F | LML | SCV angle (°) |
|---|---|---|---|---|---|---|---|---|
| 1300/1.5 | 430.0 | 18.2 | 4900 | 67 | 23 | 31.7 | 47.5 | 30 |
| 1500/2.0 | 362.4 | 16.4 | 3550 | 67 | 23 | 30.0 | 47.5 | 30 |
| 1800/2.5 | 367.2 | 15.8 | 3850 | 67 | 23 | 30.0 | 41 | 30 |
| 2400/2.5 | 350.8 | 12.0 | 3800 | 67 | 23 | 30.3 | 32.5 | 30 |

As shown in Table 2, the air/fuel ratio was highest when revolutions per minute is 1300 rpm and the combustion pressure was 1.5 bar, and the amount of the total hydrocarbon was the smallest at 1500 rpm/2.0 bar.

While this invention has been described in connection with what is presently considered to be the most practical and preferred embodiment, it is to be understood that the invention is not limited to the disclosed embodiments, but, on the contrary, is intended to cover various modifications and equivalent arrangements included within the sprit and scope of the appended claims.

What is claimed is:

1. A direct fuel injection internal combustion engine including a combustion chamber defined by a cylinder head having a spark plug, a fuel injector, an air intake comprising a first and a second intake port on an intake side of the cylinder head with a swirl control valve, an exhaust on an exhaust side of cylinder head, a cylinder bore, and a piston with a piston head having a vaporization portion, the piston being received in the cylinder bore below the cylinder head, the piston head comprising;

a bottom surface formed with a predetermined depth and gradient;
   an arc-shaped first wall connected to the bottom surface and formed below the exhaust side of the cylinder head;
   an arc-shaped second wall connected to the bottom surface and also formed below the exhaust side of the cylinder head;
   a protrusion portion formed between the first wall and the second wall; and
   an arc-shaped third wall connected to the bottom surface and formed below the intake side of the cylinder head;
   wherein if first and second imaginary perpendicular lines are drawn over the top of the piston to intersect a center line of the piston, dividing the same into four equal sections, the first perpendicular line being positioned between the first and second intake ports, the second imaginary perpendicular line intersecting and being perpendicular to the first imaginary perpendicular line at the center line of the piston, and three imaginary distance lines being drawn parallel to the second perpendicular line, the first imaginary distance line extending from a tip of the protrusion portion, the second imaginary distance line extending from a point on the first arc-shaped wall farthest away from the second perpendicular line, and the third imaginary distance line extending from a point on the second arc-shaped wall farthest away from the second perpendicular line, wherein if a first distance between the second perpendicular line and the first distance line is "a", a second distance between the second perpendicular line and the second distance line is "b", and a third distance between the second perpendicular line and the third distance line is "c", an inequity is a<b<c, and wherein the fuel injector is oriented at an angle of 10~20° with respect to a horizontal line passing through the fuel injector and the center line of the piston.

2. An engine of claim 1 wherein the protrusion portion is formed opposite of the fuel injection valve, and the arc-shaped second wall has a smaller radius of curvature than that of the arc-shaped first wall.

3. An engine of claim 1 wherein the bottom surface of the vaporization portion declines from the intake side to the exhaust side at a predetermined angle.

4. An engine of claim 1 wherein the injector is oriented to the first wall for spraying fuel.

5. An engine of claim 1 wherein the vaporization portion on the piston head is formed such that a fuel flows clockwise ward.

6. An engine of claim 1 wherein the first distance "a" between the second perpendicular line and first distance line is between 10 mm and 17 mm.

7. A piston for a direct fuel injection internal combustion engine including a combustion chamber formed by a cylinder head having a spark plug, a fuel injector, an air intake comprising a first and a second intake port on an intake side of the cylinder head with a swirl control valve, exhaust on an exhaust side of cylinder head, a cylinder bore, and a piston head having a vaporization portion, the piston being received in the cylinder bore below the cylinder head, the vaporization portion comprising:

a bottom surface formed with a predetermined depth and gradient;
   an arc-shaped first wall connected to the bottom surface and formed below the exhaust side of the cylinder head;
   an arc-shaped second wall connected to the bottom surface and also formed below the exhaust means of the cylinder head;
   a protrusion portion formed between the first wall and the second wall; and
   an arc-shaped third wall connected to the bottom surface and formed below the intake side of the cylinder head;
   wherein if first and second imaginary perpendicular lines are drawn over the top of the piston to intersect a center line of the piston, dividing the same into four equal sections, the first perpendicular line being positioned between the first and second intake ports, the second imaginary perpendicular line intersecting and being perpendicular to the first imaginary perpendicular line at the center line of the piston, and three imaginary distance lines being drawn parallel to the second perpendicular line, the first imaginary distance line extending from a tip of the protrusion portion, the second imaginary distance line extending from a point on the first arc-shaped wall farthest away from the second perpendicular line, and the third imaginary distance line extending from a point on the second arc-shaped wall farthest away from the second perpendicular line, wherein if a first distance between the second perpendicular line and the first distance line is "a", a second distance between the second perpendicular line and the second distance line is "b", and a third distance between the second perpendicular line and the third distance line is "c", an inequity is a<b<c.

8. A piston of claim 7 wherein the protrusion portion is formed on the side that opposes the fuel injection valve, and wherein the arc-shaped second wall has a smaller radius of curvature than that of the arc-shaped first wall.

9. A piston of claim 7 wherein the bottom surface of the vaporization portion declines from the intake side to the exhaust gas side at a predetermined angle.

10. A piston of claim 7 wherein the vaporization portion on the piston head is formed such that a fuel flows clockwise ward.

11. A piston of claim 7 wherein the first distance "a" between the second perpendicular line and first distance line is between 10 mm and 17 mm.

12. A piston of claim 7 wherein the fuel injector is oriented at an angle of 1018 20° with respect to a horizontal line passing through the fuel injector and the center line of the piston.

13. A piston of claim 7 wherein the fuel injector is oriented to spray fuel onto the first wall.

* * * * *

UNITED STATES PATENT AND TRADEMARK OFFICE
CERTIFICATE OF CORRECTION

PATENT NO. : 6,070,566  
DATED : June 6, 2000  
INVENTOR(S) : Jeong-heon Lee

Page 1 of 1

It is certified that error appears in the above-identified patent and that said Letters Patent is hereby corrected as shown below:

Column 7,  
Line 37, replace "side of cylinder" with -- side of the cylinder --.

Column 8,  
Line 36, replace "flows clockwise ward." with -- flows clockwise. --.  
Line 45, replace "side of cylinder" with -- side of the cylinder --.

Column 10,  
Line 7, replace "flows clockwise ward." with -- flows clockwise. --.  
Line 13, replace "angle of 1018 20°" with -- angle of 10~20° --.

Signed and Sealed this

Sixteenth Day of April, 2002

Attest:

JAMES E. ROGAN  
*Attesting Officer*  *Director of the United States Patent and Trademark Office*